Feb. 10, 1959  J. D. RICHARDSON  2,872,936
LIQUID PHASE SEPARATION CONTROL
Filed Nov. 19, 1956  2 Sheets-Sheet 1

INVENTOR.
J. D. RICHARDSON
BY Hudson & Young
ATTORNEYS

INVENTOR.
J.D. RICHARDSON

ATTORNEYS

United States Patent Office 2,872,936
Patented Feb. 10, 1959

2,872,936

LIQUID PHASE SEPARATION CONTROL

Joseph D. Richardson, Old Ocean, Tex., assignor to Phillips Petroleum Company, a corporation of Delaware Application November 19, 1956, Serial No. 622,877

9 Claims. (Cl. 137—172)

This invention relates to a liquid phase separation system. In one aspect it relates to apparatus and a method for separation of a heavy liquid phase from a light liquid phase more volatile than the heavy liquid phase of a two-phase liquid system. In another aspect it relates to such a separation system having application in a continuously operating two-phase liquid system.

In numerous commercial operations it is necessary where two liquid phases are formed to draw off the lower phase from the system to a lower pressure zone. In many operations interface level controllers are used to actuate the control of a valve in the drawoff line. In such operations it is usually desirable to maintain a certain interface level. In other operations it is desirable to retain only a minimum quantity of the lower phase in the two-phase containing vessel. In many two-phase systems the interface between the two phases is not sharply defined and interface level controllers in such cases are of little value. In other systems, particularly where corrosive liquids are handled, interface level control equipment is preferably not used.

My two-phase liquid separation system has particular utility in petroleum refining and hydrocarbon processing and treating systems. For example, in the fractionation of low boiling paraffinic hydrocarbons, water as steam is usually contained in the overhead fractions and upon condensation two liquid phases are formed. In such a fractionation wherein propane is the desired overhead product, the overhead condensate usually consists of a propane phase and a water phase. In the fractionation of butane as an overhead product the condensate contains a liquid butane phase and a water phase. In many other hydrocarbon fractionations to which my invention can be adapted a water phase and a liquid hydrocarbon phase are produced and in all of these cases it is desired to separate the water from the hydrocarbon.

In one step of a hydrofluoric acid alkylation of paraffinic hydrocarbons a hydrofluoric acid catalyst layer is removed from a supernatant liquid propane layer. My separation process and apparatus are also useful in separating gasoline and aqueous caustic solutions and in many other similar separations. The invention has particular utility in continuously operating systems.

An object of my invention is to provide a method for separating two liquid phases from one another in which the upper liquid phase is more volatile than the lower liquid phase.

Another object of my invention is to provide a method for effecting such a separation which is simple and inexpensive to operate.

Still another object of my invention is to provide simple and inexpensive apparatus in which to practice the method of my invention.

Other objects and advantages of my invention will be realized upon reading the following description which, taken with the attached drawing, forms a part of this specification.

According to my invention I have devised a flow control operation for separating a heavy liquid phase from a light liquid phase more volatile than the heavy liquid phase of a two liquid phase system, the improvement comprising passing said heavy liquid phase through a flow control zone, subsequently passing said light liquid through said zone in a flash vaporizing operation thereby decreasing temperature downstream of said flow control zone and producing a temperature differential across said zone, and restricting the flow of said light liquid through said zone in direct response to said temperature differential.

Furthermore, for the practice of the method of my invention I have devised an apparatus comprising a vessel for containing liquid under pressure, an inlet to said vessel for admission of liquid, an outlet for outlet of liquid from the upper portion of said vessel, a conduit for outlet of liquid from the lower portion of said vessel, a flow restricting means in said conduit, a first temperature responsive device in thermal communication with said conduit intermediate said flow restricting means and said vessel, a second temperature responsive device in thermal communication with said conduit on the side of said flow restricting means opposite said first thermal responsive device, and a differential temperature controller operatively communicating with said first and second temperature responsive devices and said flow restricting means in such a manner as to operate the latter to restrict flow of liquid therethrough in response to a decrease in temperature as indicated by said second temperature responsive device with respect to the temperature as indicated by said first temperature responsive device.

In the drawing Figure 1 illustrates, in diagrammatic form, apparatus in which to practice the method of my invention.

Figure 1:
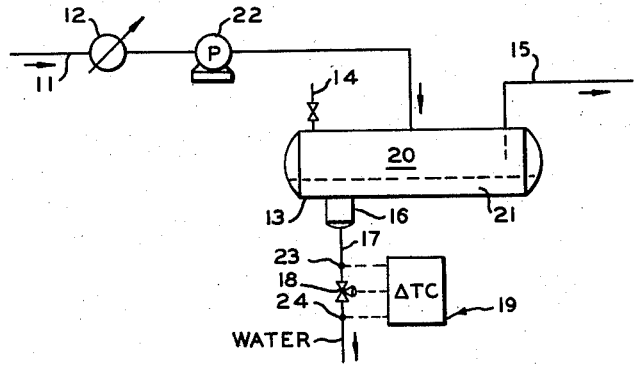

Referring now to the drawing, and specifically to Figure 1, reference numeral 11 identifies a pipe which conducts, from a source not shown, for example, a moist hydrocarbon vapor to the system illustrated. This moist vapor is condensed in a condenser 12 and condensate therefrom is transmitted under the influence of a pump 22 to an accumulator or run storage tank 13. Condenser 12 is intended to be operated at such a temperature as to condense the moisture to a liquid water and the hydrocarbon vapor to liquid so that two liquid phases are present in tank 13. The hydrocarbon phase 20 is illustrated as floating on the surface of water phase 21. A pipe 15 is provided for withdrawal of the hydrocarbon phase as the main product of this operation. A pipe 14 is provided for pressure relief or for any other useful purpose desired. Water, of course, being the heavy phase, settles to the bottom of the tank and fills leg 16. A pipe 17 is provided for removal of water from leg 16 as controlled by a motor valve 18. A temperature responsive device such as a thermocouple or gas-filled bulb 23 is provided, preferably immediately upstream of valve 18 as regards the direction of flow of liquid in pipe 17. A second temperature responsive device 24, similar to device 23 is provided in thermal communication with pipe 17 immediately downstream of motor valve 18. Reference numeral 19 identifies a temperature differential controller which operates in cooperation with the temperature responsive devices 23 and 24 in controlling opening and closing of motor valve 18.

When motor valve 18 is closed and liquid is not flowing through pipe 17, temperatures as indicated by the temperature responsive devices 23 and 24 are equal or are substantially equal. The controller 19 is set to open motor valve 18 when the temperature responsive devices 23 and 24 indicate at least about the same temperature. Thus, upon opening motor valve 18 water flows through pipe 17 and temperature at device 24 is equal to that at device 23. When all of the water layer is removed and the hydrocarbon layer begins flowing through valve 18, flash vaporizing occurs because there is a drop in pressure on flowing through valve 18. This flash vaporizing causes a drop in temperature due to the latent heat of vaporization of the volatile hydrocarbon and the temperature responsive device 24 responds to this drop in temperature and temperature responsive device 23 still remains at its previous temperature. When a temperature difference occurs across valve 18, as registered by devices 24 and 23, the temperature differential controller 19 operates to close the motor valve 18 thus allowing only an amount of hydrocarbon to pass which upon vaporization causes temperature responsive device 24 to respond to the lower temperature. It has been found that in a propane-water two-phase system the amount of propane which passes motor valve 18 and causes a drop in temperature of device 24 is quite small. The motor valve 18 then remains closed until such time as the temperature responsive device 24 rises to a temperature at least about equal to that of device 23 under which condition the temperature differential controller 19 again opens motor valve 18 and the withdrawal of water is resumed until hydrocarbon again passes through the valve. This system operates in this manner upon continuous introduction of liquid water and liquid hydrocarbon into tank 13.

Figure 2:
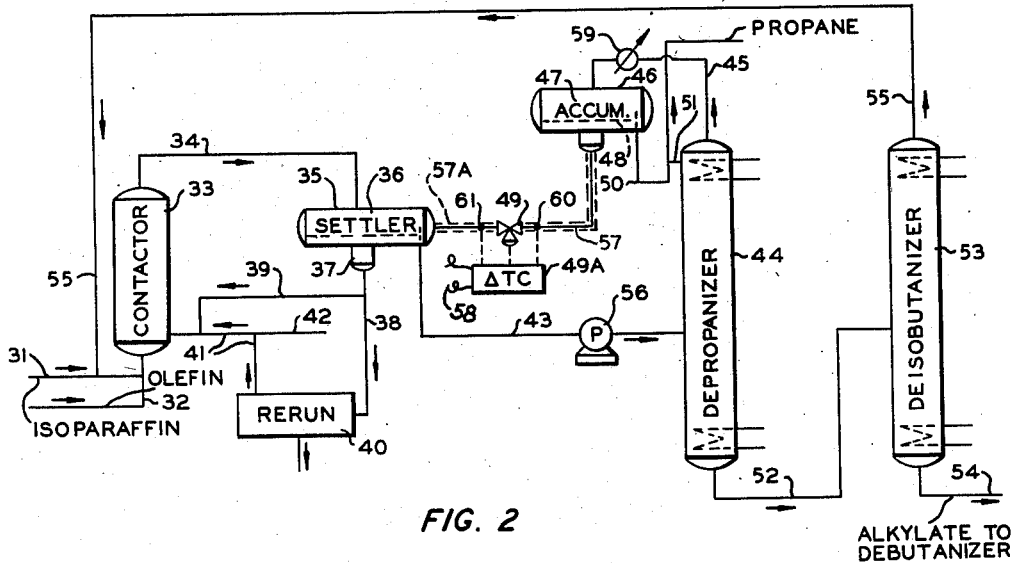
Figure 2 illustrates, in diagrammatic form, a specific application of my invention.

Figure 2 illustrates the application of my invention to a hydrofluoric acid alkylation system. In this particular system an isoparaffin hydrocarbon enters the system, from a source not shown, through a pipe 31 and an olefin hydrocarbon to be alkylated enters the system, from a source not shown, through a pipe 32. These hydrocarbons enter a contactor 33 with hydrofluoric acid being introduced thereinto from a pipe 41. Ordinarily a mixing device, not shown, is provided for contacting the several materials in tank 33. The reaction mixture leaves tank 33 through a pipe 34 and enters a phase settler 35 in which the hydrocarbon phase 36 is the light phase and a hydrofluoric acid phase 37 is the heavy phase. This hydrofluoric acid phase, of course, contains dissolved hydrocarbon and is removed from settler 35 through a pipe 38 and is passed to a rerun still 40 in which acid is recovered and recirculated through pipe 41 to the contactor tank 33. Make-up acid as required and acid for starting the operation is introduced to the system, from a source not shown, through a pipe 42.

The hydrocarbon layer 36 in settler 35 contains dissolved hydrofluoric acid and this acid containing hydrocarbon is removed from settler 35 through a pipe 43 and is passed by a pump 56 into a depropanizing fractionating column 44 in which propane and hydrofluoric acid are distilled overhead through a pipe 45. This overhead distillate is condensed in a condenser 59 and condensate is passed into an accumulator or settler 46. In this settler a propane phase 47 rises to the top and an acid phase 48 settles to the bottom. The propane phase 47 is removed through a pipe 50 and a portion required for refluxing the depropanizer 44 is passed through a pipe 51 into the depropanizer and the remainder of the propane is passed on to storage or such other disposal, as desired. The bottoms material in depropanizer 44 comprises alkylate and unalkylated material such as unreacted isoparaffin. This material is passed through a line 52 into a deisobutanizer 53 in which the isoparaffin is distilled overhead and is passed through a pipe 55 to be combined with the isoparaffin feed stock to the operation in pipe 31. Alkylate free of propane and unreacted isoparaffin is passed through a pipe 54 for subsequent treatment for such disposal as desired.

The acid layer 48 in the bottom of accumulator 46 is passed through a pipe 57 into settler 35 for use as recycled acid in the alkylation step. The withdrawal of this acid layer 48 from accumulator 46 is controlled by the apparatus of my invention as follows: a motor valve 49 is provided in pipe 57 and temperature responsive devices 60 and 61 upstream and downstream of valve 49 respectively, are also provided in thermal communication with pipe 57. A temperature differential controller 49A is provided for operation in response to temperatures as indicated by the temperature responsive devices 60 and 61. In case the temperature differential controller 49A is an electrically operated device, wires 58 lead in electric current, from a source not shown, for its operation. The operation of this flow control device is exactly like that described in detail relative to Figure 1 and briefly is outlined in that at the time the temperature responsive devices 60 and 61 register the same temperature, controller 49A opens valve 49 which opening permits flow of acid from accumulator 46 into settler 35. The passage of the last acid from accumulator 46 is, of course, followed immediately by passage of volatile hydrocarbon which flash vaporizes on passing through valve 49 and this flash vaporization decreases the temperature of the temperature responsive device 61. At this same time temperature responsive device 60 remains at its original temperature. Under this condition, that is, of a temperature differential existing between devices 60 and 61, the temperature differential controller 49A operates to close motor valve 49. Valve 49 then remains closed until the temperature responsive device 61 warms up to the same temperature as device 60, under which condition the temperature differential controller 49A again opens valve 49. In some cases of which this hydrofluoric acid alkylation operation is illustrative, it is preferable to provide insulation 57A for pipe 57.

While the flow controller apparatus illustrated in Figure 2 was stated as being an electrically operated apparatus, a pneumatically operated apparatus can, when desired, be used. The general functioning and results obtained are the same when using either type of control system.

Figure 3:
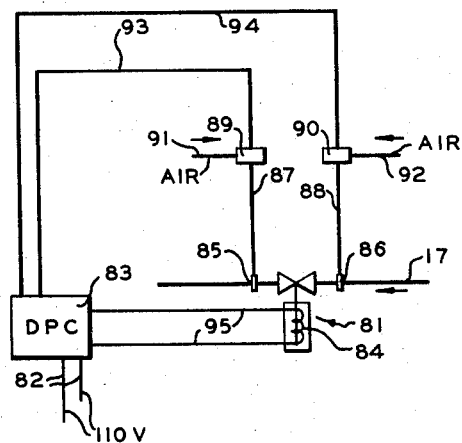
Figure 3 illustrates in more detail a combination of an electrically and pneumatically operated system for use in my invention.

In Figure 3 is illustrated a combination of an electrically and pneumatically operated flow control system as illustrated broadly in Figure 2.

In Figure 3 conduit 17 carries the liquids, the flow of which is controlled by a solenoid operated valve 81. This valve, as illustrated herein, is a normally closed solenoid valve. Thermocouples 85 and 86 are disposed downstream and upstream, respectively, of the valve and thermocouple 85 is the temperature responsive device which is intended to drop in temperature when the specifically light and volatile phase passes through the valve. Leads 87 and 88 connect thermocouples 85 and 86, respectively, with pressure controllers 89 and 90, respectively. Air is conducted, from a source not shown, through pipes 91 and 92 to these respective pressure controllers for operating a differential pressure controller 83 by way of pipes 93 and 94 from the pressure controllers 89 and 90, respectively. The differential pressure controller 83 regulates or rather opens and closes an electrical circuit to a solenoid 84 of the solenoid valve. Electrical current, from a source not shown, enters the differential controller 83 by way of conduit wires 82. The circuit between wires 82 and wires 95 is opened and closed in response to pressure differential as transmitted through pipes 93 and 94 to the differential pressure controller. This embodiment is intended to operate as follows: when thermocouples 86 and 85 are at the same temperature, or at least approximately so, it is intended that the normally closed solenoid valve 81 is opened by operation of the differential pressure controller. This controller opens valve 81 from a closed position when thermocouple 85 increases in temperature to the temperature of thermocouple 86, thus permitting flow of the less volatile liquid through conduit 17 and the valve. As long as the less volatile liquid flows, the temperature of the liquid passing thermocouples 86 and 85 is the same and the valve remains open. As soon as the more volatile liquid begins to pass through the solenoid operated valve, flash evaporizing occurs with a reduction of temperature in the vicinity of the thermocouple 85 under which condition thermocouple 85 operates to change the air pressure in pipe 93 which change in air pressure can be either an increase of pressure or a decrease of pressure, as desired. The temperature as indicated by thermocouple 86 for all practical purposes remains constant. Upon a decrease (or increase) in air pressure in pipe 93 the differential pressure controller 83 operates to open the circuit between wires 82 and 95 thereby allowing the normally closed solenoid valve to close. Upon closing of this valve the more volatile liquid, or course, ceases to flow with the result that the temperature in the vicinity of thermocouple 85 begins to rise slowly. As mentioned hereinbefore, the two liquid phases to be separated enter a tank such as tank 13 of Figure 1 continuously and after a period of time sufficient heavy less volatile liquid enters the tank to flow downward in conduit 17 (see Figure 1) thereby allowing thermocouple 85 to increase in temperature by conduction of heat in the walls of the solenoid operated valve and the pipe walls attached to and adjacent the valve. At the time thermocouple 85 reaches the temperature of thermocouple 86 the differential pressure controller 83 closes the circuit between wires 82 and 95 to open the solenoid valve 81. In this manner, the heavy and relatively less volatile liquid is withdrawn at intervals from an accumulator tank such as tank 13 of Figure 1.

Figure 4:
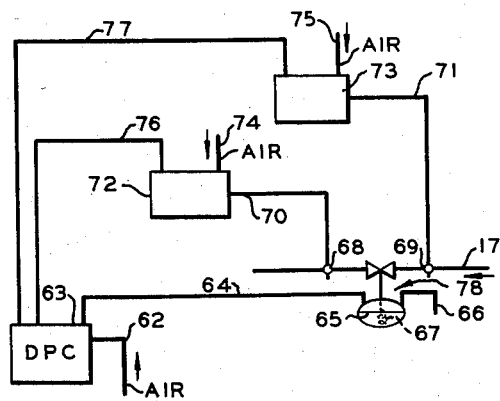
Figure 4 illustrates a pneumatically operated system for use in practicing my invention.

The embodiment illustrated in Figure 4 operates in general in the same manner as that just described relative to Figure 3 but the embodiment of Figure 4 is a pneumatically operated apparatus in place of a partially electrically operated mechanism. Referring to Figure 4 the temperature responsive devices 68 and 69 are pressure bulbs filled with, for example, gas or a liquid, such as mercury, such tubes being available in commerce from instrument supply houses. Connecting bulbs 68 and 69 are tubes 70 and 71, respectively, which, of course, are filled with the same liquids contained in the bulbs. Tubes 70 and 71 connect with apparatus in pressure controllers 72 and 73, respectively, and these controllers regulate air pressure from air enering the system through pipes 74 and 75, respectively, to control the pressure of air in pipes 76 and 77, respectively. These latter two pipes connect with a differential pressure controller 63 to regulate the pressure of air entering a pipe 64 from pipe 62 in response to the differential between the pressures in pipes 76 and 77. Valve 78 is a normally closed diaphragm operated motor valve assembly. This valve assembly is provided with a conventional diaphragm 65 which is connected with the valve and this diaphragm valve combination holds the valve normally closed under the influence of a compression spring 67. A bleed tube 66 allows bleeding of air pressure from the side of the diaphragm adjacent the valve. In the operation of the embodiment illustrated in Figure 4, from prior operation, when bulb 68 increases in temperature to that of bulb 69 the pressure controllers 72 and 73, respectively, operate to transmit equal pressures through pipes 76 and 77, respectively, to the differential pressure controller 63. With equal pressures in pipes 76 and 77 the differential pressure controller 63 operates to increase the air pressure in pipe 64 from pipe 62 to open the valve of the diaphragm operated valve 78. With the valve open, and in reference to Figure 1 of the drawing, the heavy nonvolatile liquid from accumulator tank 13 for example, flows through pipe 17 and the valve remains open until such time as the specifically light more volatile liquid begins flowing through the valve and flash vaporizing downstream therefrom. This flash vaporizing, of course, decreases the temperature in the vicinity of pressure bulb 68 and the fluid in the bulb contracts with a reduction in pressure and this pressure reduction is transmitted through pipe 70 to the pressure controller 72 which then either increases or decreases, as desired, air pressure in pipe 76 to cause the differential pressure controller 63 to close off the air flowing from pipe 62 to pipe 64. Under this condition air continues to bleed through the bleed tube 66 thereby decreasing the force tending to hold the valve open and the compression spring 67 closes the valve. Upon continued flow of both liquid phases into a tank to which pipe 17 is attached, as accumulator or tank 13 of Figure 1, the heavy loss volatile liquid flows down pipe 17 displacing the light liquid in the vicinity of the pressure bulb 69 upstream of the valve and as soon as sufficient time has elapsed for the pressure bulb 68 to increase to the temperature of pressure bulb 69, the assembly again operates to open the valve and allow removal of the less volatile heavy liquid until such time as the more volatile liquid passes the valve and flash vaporizes to decrease the temperature in the region of pressure bulb 68. At this time the assembly operates again to close the valve.

The embodiments of apparatus illustrated in Figures 3 and 4 are given merely as examples of apparatus suitable for carrying out the method of my invention. While I have disclosed pressure controllers 89 and 90 of Figure 3 and pressure controllers 72 and 73 of Figure 4 as being pneumatic controllers, these controllers can, if desired, be electrical controllers responsive to either the action of thermocouples 85 and 86, of Figure 3, or responsive to the pressure bulbs 68 and 69 of Figure 4. When these controllers are electrical controllers, then the differential pressure controllers 83 and 63 are electrical controllers so constructed as to regulate a mechanism included in controller 83 of Figure 3 and a mechanism which would be included in an electric controller in Figure 4 for regulating flow of air as from pipe 62 to 64. Actually, any suitable combination of pneumatic and electrical components, as desired, can be used in such an installation. The controllers as illustrated in Figures 3 and 4 are equally satisfactory in operation and serve the purpose of my invention.

I have disclosed hereinbefore that the control assembly of my invention operates to close valve 18 when thermocouple 24 registers a temperature below that registered by thermocouple 23. I do not wish to limit my invention in this respect because when the heavy liquid being withdrawn through valve 18 has appreciable volatility it may flash vaporize to some extent and cause thermocouple 24 to register a temperature decrease. But upon passage of a small amount of the specifically light, more volatile liquid through valve 18, this more volatile liquid easily flash vaporizes and causes a much greater decrease in temperature in the vicinity of thermocouple 24 than caused by passage of the less volatile heavy liquid. Thus the temperature controller 19 is set to tolerate a predetermined relatively small temperature decrease by thermocouple 24 without functioning to close valve. In this case the controller requires a relatively large temperature decrease to be registered by thermocouple 24 in order to cause closing of the flow control valve 18.

While certain embodiments of the invention have been described for illustrative purposes, the invention obviously is not limited thereto.

I claim:

1. In a flow control operation for separating a heavy liquid phase from a light liquid phase more volatile than the heavy liquid phase of a 2-phase system, the improvement comprising passing said heavy liquid phase through a flow control zone, subsequently passing said light liquid phase through said zone and flash vaporizing said light liquid phase therein thereby decreasing temperature downstream of said flow control zone and producing a temperature differential across said zone, and regulating the flow of said light liquid phase through said zone in response to said temperature differential.

2. In a flow control operation for restricting flow of a volatile first liquid phase maintained under pressure through a flow control zone, a lower pressure being maintained on the downstream side of said flow control zone than on its upstream side as regards direction of flow of said liquid phase through said zone, the improvement comprising passing a second liquid phase specifically heavier and less volatile than said first liquid phase through said flow control zone, subsequently passing said first liquid phase through said zone in a flash vaporizing operation thereby decreasing temperature downstream of said zone and producing a temperature differential across said zone, and restraining the flow of said first liquid phase through said zone in response to said temperature differential.

3. In the operation of the process of claim 1 wherein said light and heavy liquid phases are disposed in a common storage zone, a continuous stream of said light and heavy liquid phases is introduced into said common storage zone, and the excess of light liquid phase not flash vaporized on passing through said flow control zone is separately withdrawn from said storage zone.

4. In the operation of claim 1 wherein said light liquid phase is a volatile hydrocarbon and said heavy liquid phase is water.

5. In the operation of claim 1 wherein said light liquid phase is propane and said heavy liquid phase is water.

6. In the operation of claim 1 wherein said light liquid phase comprises a hydrocarbon more volatile than hydrofluoric acid, and the heavy liquid phase comprises liquid hydrofluoric acid.

7. An apparatus comprising a vessel for containing liquid under pressure, an inlet to said vessel for admission of liquid, an outlet for outlet of liquid from the upper portion of said vessel, a conduit for outlet of liquid from the lower portion of said vessel, a flow restricting means in said conduit, a first temperature responsive device in thermal communication with said conduit intermediate said flow restricting means and said vessel, a second temperature responsive device in thermal communication with said conduit on the side of said flow restricting means opposite said first thermal responsive device, and a differential temperature controller operatively communicating with said first and second temperature responsive devices and said flow restricting means in such a manner as to operate the latter to restrict flow of liquid therethrough in response to a decrease in temperature as indicated by said second temperature responsive device with respect to the temperature indicated by said first temperature responsive device.

8. The apparatus of claim 7 wherein said flow constricting means is electrically operated.

9. The apparatus of claim 7 wherein said flow constricting means is pnuematically operated.

References Cited in the file of this patent
UNITED STATES PATENTS

| | | |
|---|---|---|
| 1,145,509 | Pike et al. | July 6, 1915 |
| 1,697,343 | Campbell | Jan. 1, 1929 |
| 2,234,387 | Schott | Mar. 11, 1941 |

UNITED STATES PATENT OFFICE
CERTIFICATE OF CORRECTION

Patent No. 2,872,936                                          February 10, 1959

Joseph D. Richardson

It is hereby certified that error appears in the printed specification of the above numbered patent requiring correction and that the said Letters Patent should read as corrected below.

Column 5, line 7, for "evaporiz-" read -- vaporiz- --; line 48, for "enering" read -- entering --; column 6, line 14, for "heavy loss" read -- heavyless --; line 38, for "electric" read -- electrical --; column 7, line 16, for "restraining" read -- restricting --.

Signed and sealed this 13th day of October 1959.

(SEAL)
Attest:

KARL H. AXLINE                                                          ROBERT C. WATSON
Attesting Officer                                               Commissioner of Patents